350-436 SR
9/1/81 OR 4,286,846

United States Patent [19]

[11] 4,286,846
[45] Sep. 1, 1981

Bollenbacher

[54] SIGNAL VIEWER FOR AUTOMOBILE

[76] Inventor: Dale E. Bollenbacher, 4304 Apt. 2B, Hickory Rd., Mishawaka, Ind. 46544

[21] Appl. No.: 131,422

[22] Filed: Mar. 18, 1980

Related U.S. Application Data

[63] Continuation-in-part of Ser. No. 774,893, Mar. 7, 1977, abandoned.

[51] Int. Cl.³ .......... G02B 3/00; G02B 5/04

[52] U.S. Cl. .......... 350/436; 350/145; 350/243; 350/287

[58] Field of Search .......... 350/193, 243, 286, 287, 350/145

[56] References Cited

U.S. PATENT DOCUMENTS

| | | | |
|---|---|---|---|
| 1,637,309 | 7/1927 | David | 350/193 |
| 1,731,284 | 10/1929 | Andel et al. | 350/287 UX |
| 1,808,208 | 6/1931 | David | 350/193 |
| 1,826,090 | 10/1931 | Phelps | 350/193 |
| 2,109,932 | 3/1938 | Schneider | 350/193 |
| 2,549,541 | 4/1951 | Squiers | 350/193 |
| 2,602,367 | 7/1952 | Falge et al. | 350/193 |
| 2,648,566 | 8/1953 | Zeder et al. | 350/193 X |
| 2,681,589 | 6/1954 | Dow, Jr. et al. | 350/193 |

FOREIGN PATENT DOCUMENTS

| | | | |
|---|---|---|---|
| 526244 | 6/1931 | Fed. Rep. of Germany | 350/287 |

*Primary Examiner*—F. L. Evans
*Attorney, Agent, or Firm*—Paul H. Gallagher

[57] ABSTRACT

A pair of viewers for mounting in an automobile for the driver to observe driving signals that are located overhead, or in elevated position, where it is difficult for the driver to see, in his normal driving position. The viewers are in the form of plano-concave lenses having predetermined optical characteristics, having a diopter of substantially −4, and a prism angle of substantially 16°. The viewers are identical as to optical characteristics, but include mechanical means that are oppositely arranged and symmetrical for mounting them in transversely spaced positions relative to the driver. Each lens covers a certain scope or range of view, and because of their spacing apart, the ranges are different, and the driver can, by almost instant glances at one and then the other, take in a wide range of view. The mechanical mounting means are operable for positioning the lenses at, or closely adjacent, the vertical, being adjustable for so mounting them regardless of the angle of the windshield relative to both the vertical and the horizontal.

9 Claims, 7 Drawing Figures

14 18c 18 18a 18b 18d 18 14 18 22 22 4

18
5
22
24
26
35
32
28
30
34
5

37
16°
18
44
22
40
38
35
36
26
24
42

18
18
26
22
24
38
28
35
34
32
30

18
22
44
35
38

42

SIGNAL VIEWER FOR AUTOMOBILE

This application is a continuation-in-part of my prior and co-pending application, Ser. No. 774,893, filed March 7, 1977, now abandoned.

FIELD OF THE INVENTION

The invention relates to means for viewing driving signals and other things by the driver of an automobile, particularly those signals which are overhead or elevated at a substantial height. It is often very difficult for the driver of an automobile to observe the signals overhead, and the most usual jesture in attempting to observe them is to lean forward so that the head is closely adjacent the windshield, and look upward. This always is awkward and many times very difficult, and while the automobile is moving, very dangerous. It has become all the more difficult in modern times because of the use of seat belts, in the use of which the driver is sometimes actually prevented from leaning forward sufficiently to observe the signals. The present invention is designed to overcome such difficulties.

OBJECTS OF THE INVENTION

A broad object of the invention is to provide viewing means, for use in an automobile, enabling the driver's viewing overhead driving signals, which includes:

(a) lenses of predetermined optical characteristics whereby to provide more accurate and more readily observable range of viewing;

(b) such lenses that encompass a relatively wide range and present an image within a well workable area of observation in the lenses;

(c) a pair of such lenses of identical optical characteristics, pre-positioned relative to each other and to the driver, whereby they present fields of view that are similar and adjacent but of different scopes whereby to present to the driver a more complete view of the total field to be observed;

(d) specifically, lenses having a diopter of substantially −4, and a prism angle of substantially 16°.

DESCRIPTION OF A PREFERRED EMBODIMENT

Figure 1:
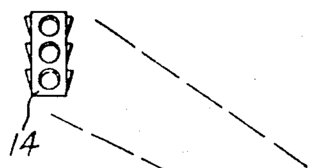
FIG. 1 is an elevational view of an automobile with a driver therein and an overhead signal as seen by the driver through the signal viewer of the present invention, a portion of the side of the automobile being broken away to better illustrate the operation of the signal viewer.

Referring in detail to the drawings, FIG. 1 shows an automobile or car 10 in which a driver 12 is seated, viewing an overhead or elevated signal, a stoplight 14, through the signal viewers 16 of the present invention. The automobile has the usual windshield 18 which may be at any angle, since, as is well known, the windshields in the different automobiles are disposed at different angles, relative to the vertical or the horizontal. The top or roof of the automobile is indicated at 20.

In the design of automobiles, the head of the driver, or his eyes, in a normal driving position, is positioned an appropriate distance from the windshield according to various factors, including the positioning of the steering wheel, instrument board, etc. This distance is taken into account in the design and construction of the present invention, as will be referred to again in detail hereinbelow. The distance may be for example 20" to 24", but it can vary widely and it is not of importance, but is considered from the standpoint of convenience.

The position of the driver in practically all automobiles, makes it difficult for him to view the overhead signals, and he must lean forward and look upwardly in order to observe them. This is not only difficult, but in many cases he is actually prevented from leaning over because of seat belt confinement.

Figure 5:
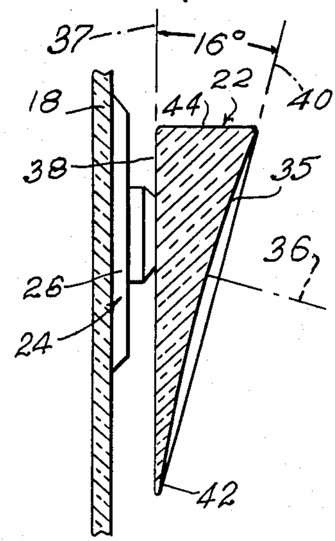
FIG. 5 is a vertical cross sectional view of the signal viewer, taken at line 5—5 of FIG. 4.
Figure 6:
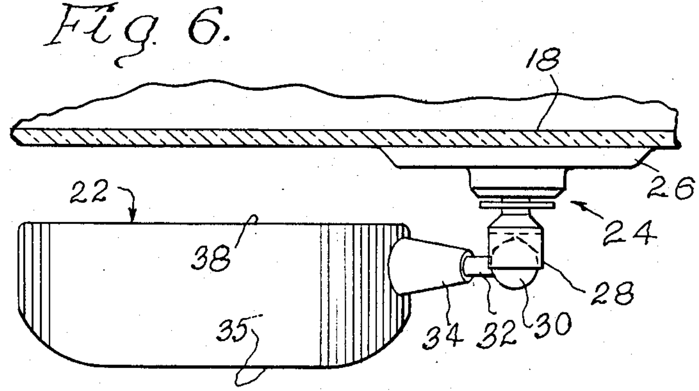
FIG. 6 is a top view of the signal viewer as shown in FIGS. 4 and 5 illustrating the manner in which it is mounted on the windshield of an automobile.
Figure 7:
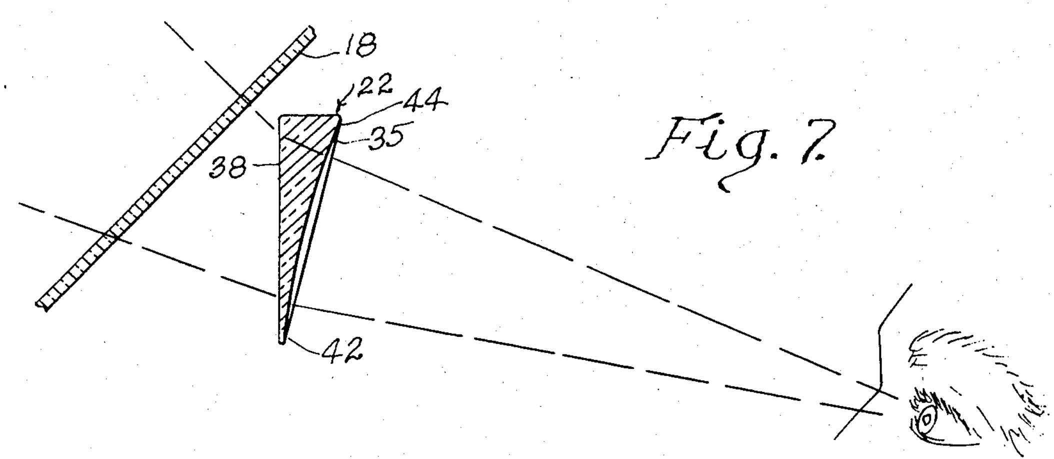
FIG. 7 is an enlarged fragmentary side elevational view illustrating the manner in which the signal viewer is used.

The signal viewer of the present invention is of the optical type, including a lens 22, which is described in detail hereinbelow, but for convenience, reference is first made to the mounting means for the lens. This mounting means is designated in its entirety at 24 and includes a base plate 26 which is fitted to the windshield as shown in FIG. 5 and secured thereto by any known and convenient means, such as a suitable adhesive material. Secured to the base plate is a socket construction 28 in which is mounted a ball 30, and extending from the ball is a radial arm 32 which includes an outer element 34, the latter element being secured directly to the lens. The means for so securing this element to the lens is of known character and need not be described herein. The ball and socket joint, 30, 28, provides universal movement and adjustment of the lens, as will be understood, this adjustment also enabling turning of the lens about the axis of the arm 32.

Figure 2:
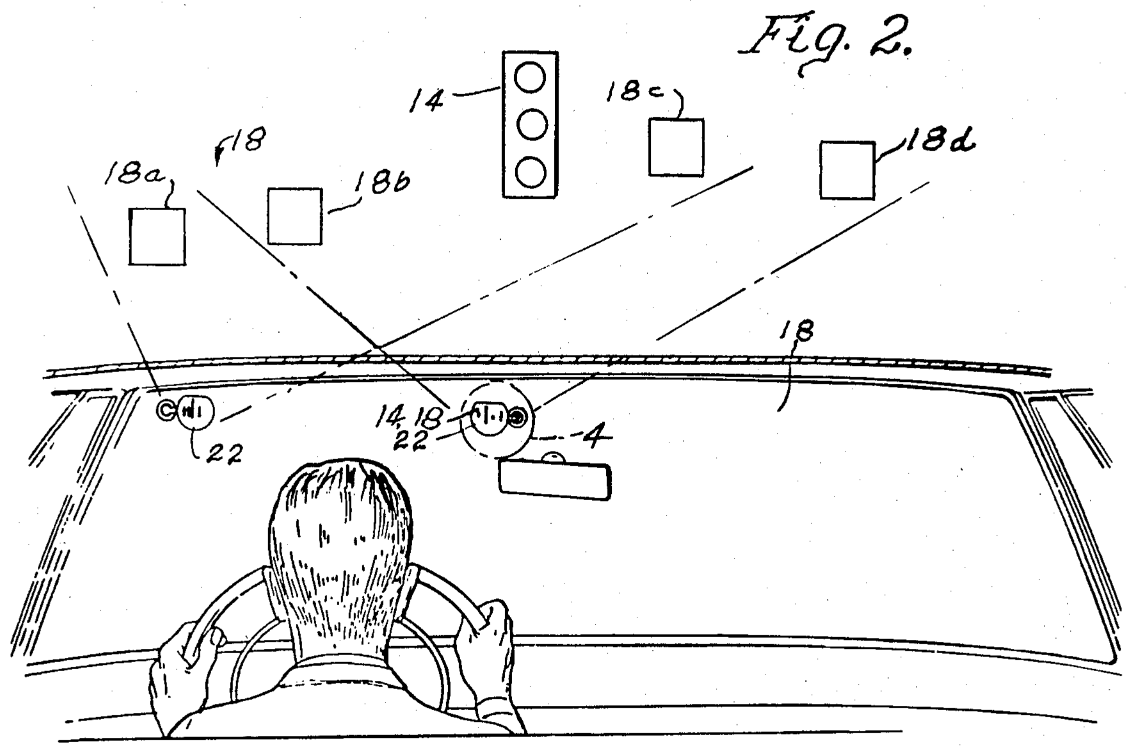
FIG. 2 is a vertical cross-sectional view through the automobile, as viewed from behind the driver as indicated by line 2—2 of FIG. 1, showing the manner in which the present signal viewer may be used to observe overhead or elevated traffic signals.

It will be seen that two such signal viewers are utilized, as represented in FIG. 2. These viewers are preferably disposed symmetrically on opposite sides of a forward line from the driver, and spaced apart such distance that one is closely adjacent the upper left hand corner of the windshield, and the other closely adjacent the top at the middle of the windshield. They are preferably placed at the very top of the windshield so as to minimize any obstruction of the driver's view of any and all objects that are in lower position, and not overhead. The mounting means 24 in the two signal viewers are identical or symmetrical and the two viewers are arranged with the lenses directed toward each other and the mounting means laterally outwardly thereof.

The lenses are preferably identical in outline or peripheral shape, as well as in optical characteristics. The lenses are plano-concave in shape; the concave surface has a diopter of substantially −4, and the lens has a prism angle of substantially 16°. As will be understood by those skilled in the art, the concave surface 35 is symmetrical about a central axis 36. The prism angle is calculated relative to a line 37 lying in the plane surface 38, and a line 40 perpendicular to the axis line 36 and touching the concave surface at the central point thereof. The angle between these two lines is 16°, forming the prism angle referred to above.

The lens may be be of any suitable transparent material presently used in lenses, such as glass or plastic, plastic being preferred because of less likelihood of scratching or other impairment, or of breaking.

The disposition of the concave surface, as established by the angle of 16°, of course, forms a narrow edge 42 of the lens, and a thick edge 44. In the present instance, the two surfaces, plane and concave, are so positioned that the two surfaces nearly touch at the bottom, forming nearly a knife edge, but it is greater than a knife edge for practical considerations in the manufacture of the lens, and to prevent or minimize breaking at that location.

Figure 3:
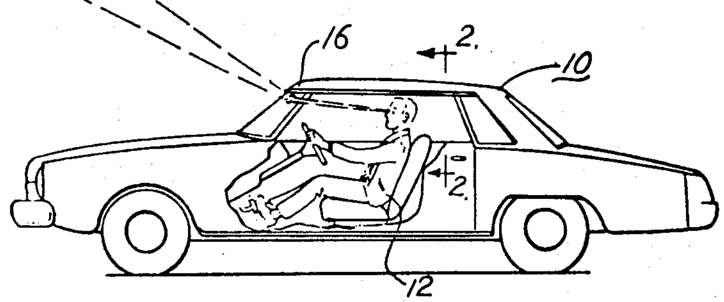
FIG. 3 is an enlarged detail view of the viewers oriented according to FIG. 2, more clearly showing the images formed by the lenses.
Figure 3:
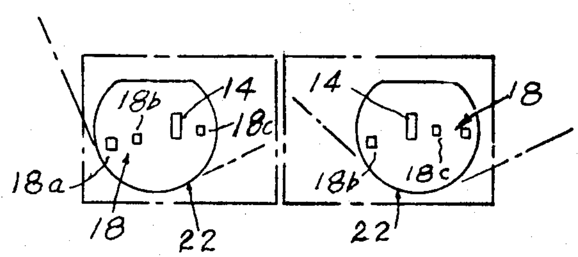

FIG. 3 shows the lens as being non-circular. This shape is selected from the standpoint of appearance, but the shape and dimensions sf the concave surface are predetermined according to an initial circular lens, indicated by the dot-dash line 46, this relationship holding notwithstanding a portion of the periphery of the lens being removed, as in the present case.

Figure 4:
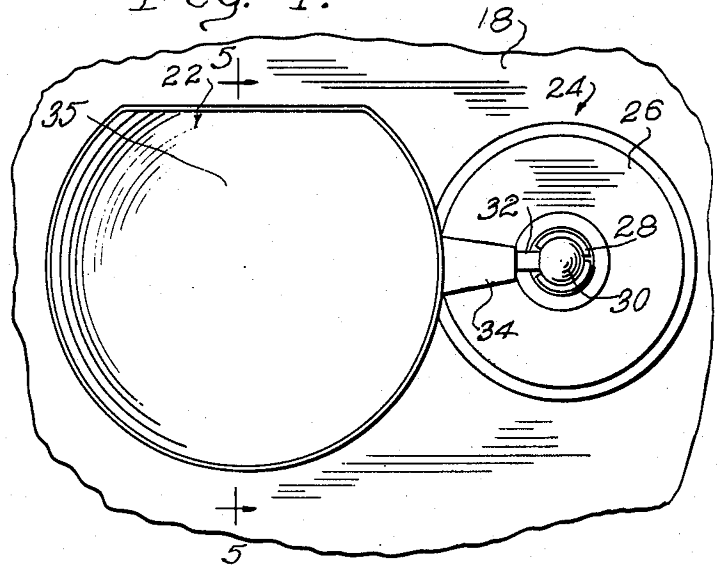
FIG. 4 is an enlarged elevational view of the signal viewer, as encircled by dot-dash line indicated by the reference numeral 4 in FIG. 2.

The actual outline size, or diameter, of the lens is not critical, but regardless of the size that is utilized, the optical characteristics, i.e., diopter and prism angle, are substantial as stated. Regardless of the overall size, within reasonable limits, a certain field will be encompassed by the lens and the lens will present a corresponding image to the driver, but the size of the image will be different, —if the lens is too small the image may be objectionably small and difficult to apprehend quickly considering the distance of the driver's eyes from the windshield, while on the other hand, if the lens is too large, it will cover an objectionable area of the windshield and correspondingly obstruct the vision of the driver through the windshield. I have found that lenses of a diameter of in the neighborhood of 2½" (greatest horizontal dimension FIG. 4) will produce the best results in proportion to the distance of in the neighborhood of 20" to 24" which may be considered typical of many automobiles as the distance between the driver's eyes and the windshield. In lenses of this size, the image presented is relatively large, sufficiently large for the driver to quickly observe the image and apprehend the signal that need be observed. A principal factor involved is the "sightedness" of the driver, i.e., whether he far sighted or near sighted. While a far sighted person could probably quickly apprehend a relatively small image, a near sighted person may desire a relatively larger image, and the dimensions mentioned may be considered as typical or average, but the invention is not limited to any specific sizes or proportions in this regard and any in a wide range may be utilized.

For best results I have found that the lenses should be closely adjacent the vertical, and preferably with the plane surfaces in that position. However, they may be slightly angled from that exact position, but if so, only a relatively small amount.

With respect to the height of the lenses, an ideal situation of course would be with the lenses positioned at the same height as the driver's eyes. In many cases, they may be so positioned, but they need not always be so mounted, and in many cases, they would be above his eyes, but in any case, they are shaped and positioned for receiving light rays from the overhead signals and refracting or bending them toward the horizontal as represented in FIG. 1.

The universal adjustment provided by the ball and socket connection 30, 28, and the arm 32, enable the lenses to be positioned in the desired position regardless of the angular position of the windshield, relative to both the horizontal and the vertical as stated above. Once the lenses are in proper position, they need not be readjusted, and may be left in an original setting indefinitely.

The two lenses are operative for encompassing similar fields and presenting corresponding images; they are of identical size and therefore the images are of correspondingly identical size; however, because of the transverse spacing apart of the lenses, they encompass different fields, although the difference of the fields is not great. Assuming any number of signals in the field or scope to be observed, most of them would appear in the images of both lenses, although the laterally outermost portion of each of the fields may be eliminated in the other lens. FIGS. 2 and 3 represent this condition. FIG. 2 includes the signal light 14, but also several other objects 48, which are arbitrarily selected items, at random positions, but elevated. This figure also indicates that the left lens encompasses the leftmost four of the five items, 14 and 48, while the right lens encompasses the rightmost four. These items 48 are individually identified 48*a*, 48*b*, 48*c*, 48*d*, for convenience in identifying them in the respective images. FIG. 3, of larger scale, shows the same four, respectively, in each lens, as in FIG. 2. Thus, most of the elements included in each field will be included in both images and the driver may see in one image an element that is not included in the other, but in normal driving habits, he quickly glances back and fourth at them, this alternate glancing being, from a practical standpoint, instantaneous.

An additional result of the arrangement is that if a significant element is obstructed from one lens for example, it would usually be included in the other one. This condition is indicated by the fact that the signal light 14, in this case the central item and the most significant to be observed, is included in both images, and as to the other items, if any one is not included in one of the images, it would be found in the other. This situation is particularly significant in view of the fact that the car is constantly moving, in a normal driving operation, and the driver's attention is constantly being shifted, so that the overall effect of the functioning of the lenses is to present a composite image to the driver of all signals to be observed.

I claim:

1. Signal viewer for an automobile, comprising a pair of lenses and means for mounting them on the windshield of the automobile in transversely spaced positions on opposite sides of a forward line of sight of the driver, the lenses receiving light rays from overhead objects and deflecting them toward the horizontal within the automobile and thereby toward the driver, the lenses encompassing fields of vision that are laterally spaced apart but overlapping, both fields constantly including common objects between the lateral limits of the two fields taken together, the lenses forming corresponding images and presenting them to the driver.

2. Signal viewer according to claim 1 wherein, the lenses have at least one concave surface and that surface is directed inwardly toward the driver, and the lenses converge downwardly.

3. Signal viewer according to claim 2 wherein,
the lenses are of plano-concave shape.

4. Signal viewer according to claim 3 wherein,
the lenses have substantially identical optical characteristics.

5. Signal viewer according to claim 3 wherein,
the lenses have a diopter of substantially −4.

6. Signal viewer according to claim 3 wherein,
the lenses have a prism angle of substantially 16°.

7. Signal viewer according to claim 6 wherein,
the lenses are on the order of 2½" in diameter and positioned forwardly of the driver a distance of on the order of 20" to 24".

8. A method of presenting a view of signals exterior to an automobile having a windshield and a driver's seat, comprising the steps,
placing a pair of lenses at the windshield on respectively opposite sides of a forward line of sight of the driver at such positions and of such image characteristics as to encompass fields of vision that are laterally spaced apart but that overlap and include common objects between the lateral limits of the two fields taken together, and to receive light rays from overhead objects and deflect them toward the horizontal within the automobile and present independent images of the corresponding fields to the driver.

9. A method according to claim 8 and including the step,
utilizing lenses having a diopter of substantially −4 and a prism angle, converging downwardly, of substantially 16°.

* * * * *